United States Patent [19]

Andreason et al.

[11] 4,389,814
[45] Jun. 28, 1983

[54] SEEDLING TRANSPLANT UNIT

[75] Inventors: Gustav O. Andreason; Ulf R. Friberg, both of Falun; Heimo H. Kuvaja, Borlänge; Bengt G. L. Qvarnström, Smygehamn, all of Sweden

[73] Assignee: Stora Kopparbergs Bergslags Aktiebolag, Falun, Sweden

[21] Appl. No.: 231,328

[22] Filed: Feb. 4, 1981

[30] Foreign Application Priority Data

Feb. 15, 1980 [SE] Sweden .................. 8001210

[51] Int. Cl.³ .................................. A01G 9/10
[52] U.S. Cl. .................................. 47/73; 47/87
[58] Field of Search .................. 47/73–78, 47/84–87

[56] References Cited

U.S. PATENT DOCUMENTS

| | | | |
|---|---|---|---|
| 3,667,159 | 6/1972 | Todd | 47/73 |
| 3,889,416 | 6/1975 | Bergeron et al. | 47/77 |
| 3,903,643 | 9/1975 | Blackmore et al. | 47/77 |
| 4,016,678 | 4/1977 | Larsen | 47/77 |
| 4,192,096 | 3/1980 | Platt et al. | 47/73 |
| 4,197,674 | 4/1980 | Blackmore | 47/73 |

FOREIGN PATENT DOCUMENTS

| | | | |
|---|---|---|---|
| 1252090 | 12/1960 | France | 47/81 |
| 1268626 | 6/1961 | France | 47/81 |
| 1414605 | 9/1965 | France | 47/73 |
| 7713224 | 6/1979 | Netherlands | 47/86 |
| 1020945 | 2/1966 | United Kingdom | 47/73 |

Primary Examiner—James R. Feyrer
Attorney, Agent, or Firm—Jon M. Lewis

[57] ABSTRACT

A reusable seedling transplant unit for elevated growing, by germinating several seedlings simultaneously in a growth medium, contains a plurality of pot-shaped cells all joined together; each cell has an open top and bottom and is structured with a plurality of ribs extending downwardly from the open cell top to converge to the bottom. The ribs are closely spaced forming narrow slits therebetween so as to retain the growth medium in the cell during elevated growing and during transportation to a site, e.g., for reforestation. The ribs can be resiliently deformed to release each seedling for replanting in soil along with its root lump and associated growth medium, without detrimentally affecting the root lump.

21 Claims, 2 Drawing Figures

SEEDLING TRANSPLANT UNIT

FIELD OF THE INVENTION

This invention relates generally to reusable seedling units for germinating and growing seedlings and subsequently transplanting the grown seedlings; more particularly the invention concerns a reusable unitary seedling arrangement for elevated growing of seedlings. The construction of the seedling unit of the invention offers improvements over prior art arrangements and is at the same time convenient and economical for manufacture and maintenance.

BACKGROUND OF THE INVENTION

It is common procedure either in large-scale reforestation projects or in large-scale farming operations for crops and the like, for germinating and growing seedlings in containers till such time they are ready to be transplanted in the field. Often the seedlings are started from seeds in a growth medium and grown in a controlled atmosphere such as in a greenhouse till the seedlings reach a desired size. In operations involving large numbers of seedlings, it is desirable to have arrangements wherein several seedlings can be germinated and grown in a suitable large container which has facilities for easily transplanting individual seedlings into the field in an easy and convenient manner. It is expedient to devise arrangements wherein the required facilities for the growth of the seedlings are best provided, and wherein at the same time handling and rehandling of the seedlings with root lumps are curtailed to the minimum.

It is found from experience that when the growth medium surrounding the root structure of each seedling is in a very wet condition, the roots are liable to easy tearing and damage. The possibility of the root lumps being undesirably wet at the time of transplanting does occur in seedling arrangements which use a plurality of pot-like cells forming several containers with closed bottoms, where there is no provision for drainage of excess water.

It is equally important to ensure that the seedling arrangement offers sufficient facility and convenience to dislodge each seedling together with its root lump and growth medium in such a manner that detrimental separation of the growth medium from the roots does not occur at the time of transplantation. It is essential especially in reforestation projects to ensure that the survival chances of replanted seedlings are high, and root separation from the growth medium during transplanting is certainly to be avoided.

The geometry and disposition of the individual cells per se have a profound effect on the manner in which the roots are guided and distributed in the growth medium. If adjacent cells in a seedling unit are too close and do not provide any barriers to prevent roots of one seedling from approaching the roots of an adjacent seedling, the roots will invariably get tangled and cause problems when the seedlings are lifted out of their cells. If, on the other hand, a barrier such as a substantially cylindrical enclosure is provided for each cell, it is found in practice that roots of each seedling which start horizontally to begin with, soon hit the interior wall of the cylindrical enclosure, curve in and soon form spirals of intertwined roots which will detrimentally affect the growth of the seedling when it grows into a plant or a tree.

It is found expedient to provide vertical rib-like formations on the inside wall of each cell, whereby the roots do not form a spiral tangle; however, such vertical rib-like formations may have an undesirable tendency of directing the roots in directions other than the normal growth direction of the roots. Further, experience has shown that if the side walls of the cells have openings for draining and air admission, any roots that tend to emerge from the openings stop and are virtually pruned by the surrounding air.

In many large-scale reforestation projects, there seems to be a strong trend in favor of what is termed "elevated growing" wherein the underside of the cells is surrounded by air, and the required water for growing is supplied from the top only. The most obvious advantages of such an arrangement, as stated supra, are air admission, ease of drainage of excess water and air pruning of roots.

Reverting to yet another aspect of the geometry of the cells per se, the question as to whether the cell should necessarily have an opening at the bottom (in addition to other side openings for drainage and air admission) is governed by whether the seedlings have a tap root or not. Where the seedlings do develop a tap root, provision of an opening at the cell bottom permits the tap root to grow straight down right at the seedling stage, ensuring fast growth and good endurance against any forces while the seedling grows into a plant or a tree.

In certain situations, seedling cells made of disposable material, e.g., net-like containers, or a degradable organic material, are known to be used, thus obviating the need for removal of the seedling from the cell. These arrangements, however, suffer from severe limitations in general, especially during handling and transportation; furthermore, such disposable cells in themselves are invariably unsuitable for elevated growing without the assistance of auxiliary containers for handling and shipping.

While numerous geometrical shapes and arrangements have been developed to provide several of the aforementioned desirable features in seedling units, it has been found that in the case of reusable seedling units, removal of seedlings along with their root lumps and growth media, without the seedling sustaining any root damage or separation from growth medium, has invariably presented a problem. Accordingly, it is desirable to provide an improved construction which facilitates easy and safe removal of seedlings together with their root lumps from the cells of seedling containers, at the same time retaining the advantageous features discussed supra.

DESCRIPTION OF PRIOR ART

There are numerous publications and patents available in the field of seedling containers and units; a few prior United States and French patents which will serve to highlight the characteristic features of our invention will be discussed herein below.

U.S. Pat. No. 3,667,159 teaches a unitary seedling "flat" made of rigid plastic and containing a plurality of cells in the form of square downwardly tapering recesses. The seedling flat of this prior art reference has no special facilities for releasing the seedlings together with their root lumps; the seedlings have to be apparently pulled out of the cells as illustrated in the patent. Also, there are no openings at the side walls of any cells in this prior art patent, thus losing the advantages of air pruning of the roots, and aeration for the roots. The emphasis in this prior U.S. patent is on rigidity of the "flat" during handling, and low initial cost of manufacturing the "flats." The recommended material for making the "flat" is foamed polystyrene or other rigid plastic. The "flat" in this prior art U.S. patent is not entirely suitable for elevated growing and does not provide sufficient ventilation for the roots, and offers no special advantages for safe and easy removal of the seedling root lumps.

U.S. Pat. No. 4,016,678 teaches a disposable seedling transplant container made of a net-like tubular material which is stronger along the warp as compared to its weft; the container can be machine planted and yet be easily ruptured by the growing plant. The text of the U.S. Pat. No. 4,016,678 clearly suggests that the teaching therein is limited to in-soil germination and growing of seedlings unlike the present invention. The containers are unintended for elevated growing and cannot be used for elevated growing unless mechanically supported by some external arrangement. There is also no clear provision in this prior art U.S. patent for air pruning, nor for preventing roots entangling between adjacent plants where the seedlings are still in the growth medium before transplantation into the field.

U.S. Pat. No. 3,889,416 to Bergeron et al teaches a seedling arrangement for reforestation purposes, containing a plurality of tubes adapted to be supported vertically in a tray. The tubes have open bottom ends but include no openings whatsoever at the sides for aeration. All the roots developed by a seedling are guided downwardly towards the lower open end, which may be somewhat undesirable and unnatural. The tubes in this prior art U.S. patent are intended for elevated growing, but contain no special provision or convenience for easily dislodging the seedling without damage and separation inflicted on the root lump. In fact, the vertically extending ribs provided on the inner cylindrical surface of the tubes in this U.S. patent tend to make the tubes rigid and stiff by reinforcing, whereby the tubes will not easily flex. If the tubes possess a very rigid reinforced structure, it is very inconducive to safely releasing the seedlings with their root lumps and the growth medium. The problem of being able to safely dislodge the seedlings is indeed recognized in column 4 of the U.S. Pat. No. 3,889,416 wherein is stated, ". . . If there is any tendency for the roots to stick in the cells, this may be overcome by rolling or pressing the . . . plastic cells in order to compress the growth media and the roots which it contains to a compass at which it may be readily removed from each cell." However, as aforesaid, the inner vertical ribs in each cell disadvantageously render the cell stiffer; furthermore, any rolling or pressing action on the tubular cells to compress the growth medium invariably results in root exposure caused by separation between the growth medium and the roots, which is undesirable. Besides, any rolling action on the tubes is likely to damage the upper portion of the seedling if the seedling is tender.

French Pat. No. 1,252,090 teaches seedling containers which are apparently for subsoil use unlike the present invention. It is also clear from the teachings of this prior art French patent that the containers per se as illustrated are unsuitable for elevated growing which the present invention is concerned with. This French patent is directed to an arrangement for improving space utilization and impermeability to water, and does not throw any light on problems encountered while releasing the seedlings from containers for replantation in field.

A second French patent of which invention may be made is U.S. Pat. No. 1,268,626 which apparently discloses the concept of elevated growing using a beehive-like support structure which supports a plurality of thin-walled containers which contain growth medium for the seedlings. Here also, there is no specific recognition of the desirable characteristics of seedling units for elevated growing which the present invention is concerned with.

Yet another French patent (No. 1,414,605) teaches a seedling arrangement which is unsuitable and unintended for elevated growing. The arrangement has a large container including a plurality of cylindrical recesses which receive cup-shaped cages, one in each recess. There is no evidence in this French patent that the cage structure is in any way conducive to either air pruning of roots or to safely release the root lump of a seedling. Moreover, the ribs of the cage cannot be separated or opened at the bottom of the cup-like structure for releasing the seedling along with its root lump and growth medium.

SUMMARY OF THE INVENTION

The present invention provides a seedling transplant unit, which while ensuring that excess water drain and air pruning of roots are provided, insures that the growth media will stay attached to the root lump and maximizes the ease with which the root lump can be separated from the seedling transplant unit. The present invention also provides low cost reusable seedling transplant units which are convenient and functionally efficient during the growth, transportation to the field and final transplanting of the seedlings.

The invention in its broad form consists in a reusable seedling unit for elevated growing, using a growth medium, comprising:

a substantially flat member forming a top of the seedling unit, said flat member having a plurality of openings all arranged adjacent to each other in an array, said flat member having a plurality of pot-like cells, one depending from each opening, each cell being formed from a plurality of elongated strip-like members depending from the periphery of each said opening and converging downwards to form a cup-shaped cell, the plurality of converging strip-like members of each cell forming slits between adjacent of said strip-like members, giving each cell a cage-like appearance as illustrated the slits having an average width which will not let through the growth medium in use, the converging strips at their free bottom ends forming an opening which will not let through the growth medium in use.

In a preferred embodiment described herein, there are provided several seedling pots or cells adjacent each other and joined to form a unitary construction. Each pot or cell comprises an upper frame surrounding a top opening and a plurality of strips (e.g., eight) extending downwardly from the opening and converging as they reach the bottom of their lengths, to define a bottom opening which is substantially smaller than the top opening. In other words, the strips converge downwards to form a tapering pot. The strips are rigid enough so that without being connected by transverse members they can keep the root lump enclosed during growing of the seedling and during handling and transportation of the unit. At the same time they have such a resilience that they may be bent apart sufficiently enough to free the root lump so that when they are let go, they recover their original position. At the bottom of each pot the strips end defining an opening and without any cross connecting members. The growing medium and the root lump are held in place by the tapering of the pot. In order to improve the functioning of the strips when they are supporting the growth medium, they may optionally be formed with an inwardly convex arched section.

The slit between the strips is narrow enough such that the growing medium is retained between them, for e.g., preferably 2-10 mm. Advantageously, the strips are of about the same breadth as the opening of the slit between them. When the roots of a plant reach the strips they divert towards a slit and grow out into an interstrip gap or slit. At elevated growing, the growth of this root through a slit is stopped by the air. The roots will not substantially deviate from their natural direction of growing and when transplanted in the soil continue to grow in a natural direction. It will not result in a tangling of roots all turned downwards towards the bottom opening of the pot. Because of the design of the pot, the root lump may be released by slightly opening the strips and pressed up from the pot without damaging the roots at the time of transplanting.

DESCRIPTION OF THE EMBODIMENT

Figure 1:
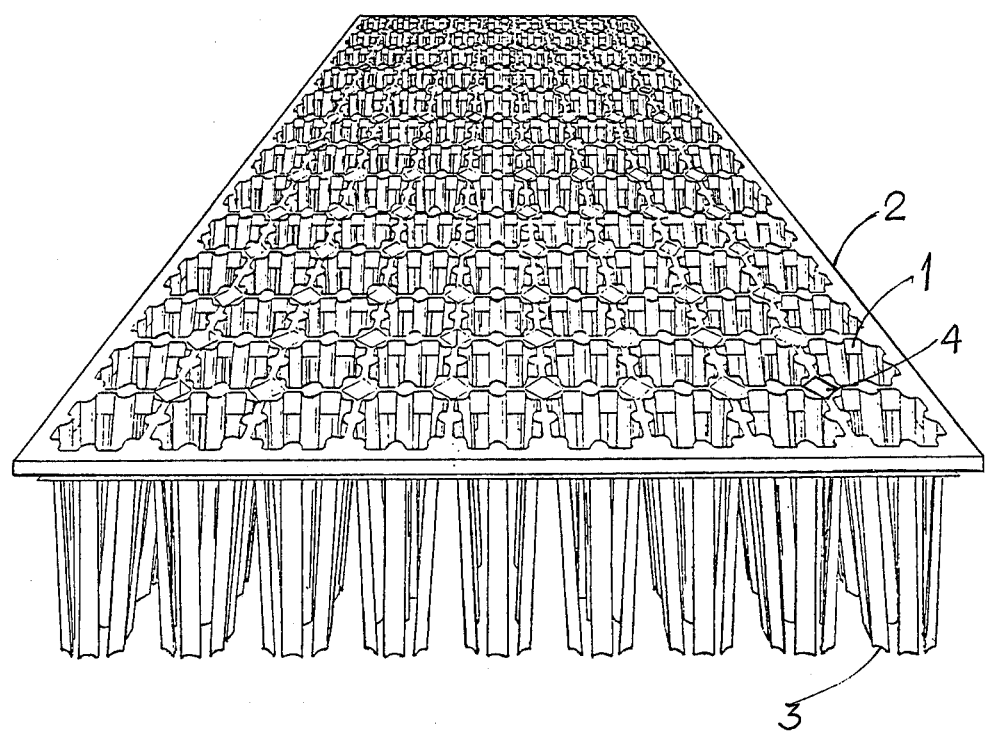
FIG. 1 shows a seedling unit according to an embodiment of the invention comprising an array of seedling pots or cells joined to a unit.

With particular reference to FIG. 1, each pot or cell of the array of cells consists of an upper frame 1, which at the same time forms part of the upper side of the seedling unit. Each cell comprises a top opening in the upper frame, from which opening depend a plurality of strips 3 which converge downwardly to form a downwardly-tapering pot. The bottom of the pot preferably has an opening which is substantially smaller than the top opening. As aforesaid, if seedlings which develop a tap root are envisaged, it is expedient to provide a bottom opening where the tap root will be air pruned during the seedling stage. After subsequent transplantation into a field or a reforestation area, the pruned tap root will reactivate and continue growth in the normal downward direction. If such a bottom opening is not provided, the tap root is likely to hit a closed cell bottom and turn up at the seedling stage. When subsequently transplanted, the tap root which has been misguided initially, may not take the natural course. In the case of seedlings which are known to develop no tap roots, there is no need for an opening to be provided at the bottom. The strips 3 in such an instance may be made to converge to contact each other with no detrimental effect; according to the concept of the invention, the strips are still openable at the bottom end of the cell, to facilitate release of the root lump. The pots may be filled with a growth medium such as peat or mixtures of peat, fibers and/or mull. One or more seeds may be placed in each pot. The seedling units may if necessary be placed in a greenhouse before supplying with water and nourishment.

The seedling unit, preferably, is made of a durable, flexible quality plastic, e.g., ABS plastic, polypropylene or polystyrene. Either the whole seedling unit is formed in one piece or it is made by joining individually produced pots. Individually produced pots may be joined by welding or glueing or fixing into a screen of plastic or metal.

A seedling unit according to the invention is filled with a growth medium e.g. as described in the international patent application PCT/SE79/00229. Seeds are placed in the pots in a way known per se. The seedling unit is placed in an appropriate stand in a greenhouse in such a way that the underside is surrounded by air. By supplying light, water and nourishment the seedlings are allowed to grow to the desired size. The seedling units are then transported out into the field or reforestation area where the seedlings may be separated and planted. The seedling units are then returned to the greenhouse for re-use. The above PCT application has a U.S. Ser. No. of 198,942, a date of filing under 35 U.S.C. 103(e) of July 3, 1980, a date of commencing of national processing of July 8, 1980, and is assigned to the assignee of the present application.

Facilitating air circulation through the seedling unit are optional openings 4 illustrated in FIG. 1. The size and number of these openings may be chosen suitably depending on the requirements.

Figure 2:
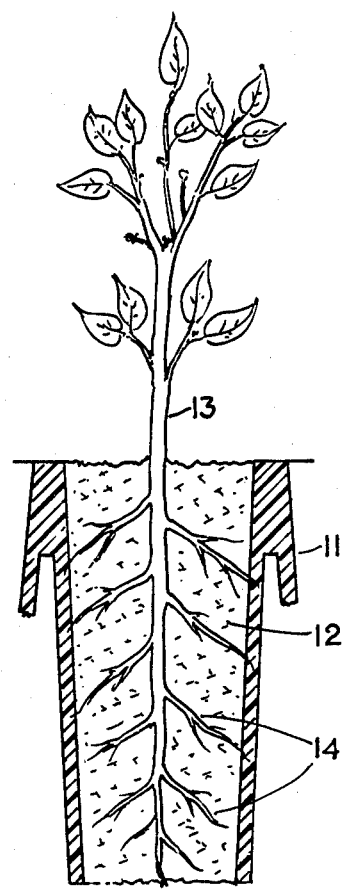
FIG. 2 shows a section of a seedling pot with growing medium and a seedling whose roots without changing their direction have stopped growing at the outer surface of the root lump.

FIG. 2 illustrates a section of a seedling cell or pot showing the growth medium 12 and a seedling 13 having roots 14. It is seen from the illustration how the roots are air pruned and stop growing at the outer surface of the root lump without significantly changing their direction. After transplanting into the reforestation area or the field, the roots will be reactivated to continue to grow in their normal direction, thus ensuring maximum assimilation of nutrients and a consequent healthy plant.

According to this invention, the number of strips depending from the top opening in each cell, and the width of the slit between consecutive strips can be chosen depending on the consistency of the growth medium in question. It is to be recognized that mixtures of peat, fibers or mulch or mixtures thereof would have varying consistencies depending on the source and the mixture. The slit dimensions should be such as to prevent the growth medium from falling through the slits and the bottom opening in all circumstances which are encountered, including handling and transportation. It is also to be recognized that if the slits are parallel throughout their length, then the strips are tapered, being wider at the top and narrower at the bottom. On the other hand, if the strips are parallel, the slits are wider at the top and narrower at the bottom. Alternatively, both may be tapered. As aforesaid, a preferred dimension for the slits is 2-10 mm, and it is also desirable that the average width of the slits and the strips be substantially the same. Yet another governing factor is the thickness of the strips (the thickness may be uniform or tapered) which in itself has to be chosen depending on the material of which the strips are made and the extent of rigidity required.

In the illustrated embodiment, the strips 3 are formed with a predetermined degree of curvature or convexity towards the axis of each cell. Such convexity will assist in increasing the stiffness of the strips. Other alternative modifications to bring about increased strip rigidity are within the purview of this invention.

It is seen from the foregoing that the invention provides a seedling unit offering the following features:
1. Has the advantages of elevated growing including air pruning and ventilation.
2. Convenient for handling and transportation.
3. Ease of root lump removal for transplanting, without causing root damage and without causing root separation from the growth medium.
4. Economical to manufacture and easy to maintain.
5. Overcomes the disadvantages of prior art seedling units for elevated masss growing of seedlings.

What is claimed is:

1. A seedling unit using a growth medium for elevated growing of seedlings and for repeated use, comprising a plurality of seedling pots disposed adjacent to and joined to each other at the region of their openings, each pot including: an upper frame forming a top part of the seedling unit, a plurality of spaced strips extending from each said opening in a convergent manner to form each said pot substantially to look like a downwardly converging cage, the spaced strips being free and substantially devoid of bends at their loose ends and defining an open bottom of the pot and being dimensioned to retain the weight of a desired amount of growth medium in each pot, said convergent strips being directly in contact with growth medium in use and being resilient enough to spring back to their original shape when opened in use to be substantially parallel to each other temporarily to release the growth medium along with a seedling for transplantation.

2. A reusable seedling transplant unit for elevated growing, comprising:
a substantially planar top surface;
a plurality of cage-like seedling pot-cells having open bottoms and retaining a growth medium and a seedling root lump in use and extending substantially perpendicularly from said planar surface, and disposed in an array;
each cell including an upper frame which is disposed as part of said planar surface, said upper frame having a central opening in the plane of said planar surface;
each cell including a plurality of spaced strips originating at said opening and convergently extending to form a cage-shape to comprise each said cell, said strips being directly in contact with the growth medium and said seedling root lump and so spaced as to define slits of predetermined average width which will not let the growth medium fall through;
said strips being rigid enough as to retain said growth medium in use and being resilient enough to spring back to position when deformed to release the root lump.

3. A seedling transplant unit as in claim 2, wherein said slits have an average width between 2 mm and 10 mm.

4. A seedling transplant unit as in claim 2, wherein an average width of the slits is substantially equal to an average width of said strips.

5. A seedling transplant unit as in claim 3, wherein said strips of each cell have a transverse cross sectional profile which is convex towards the inside of said each cell.

6. A seedling transplant unit as in claim 5, including a plurality of openings in the planar surface in regions between upper frame regions of said plurality of pot cells, to improve ventilation.

7. A seedling transplant unit as in claim 2, wherein the plurality of cells and the top surface have a unitary construction.

8. A seedling transplant unit as in claim 2, wherein the seedling pot cells are made of polypropylene.

9. A seedling transplant unit as in claim 2, wherein the seedling pot cells and the top surface are made of Acrylobutylstyrene.

10. A seedling transplant unit as in claim 2, wherein the pot cells and the top surface are made of polystyrene.

11. A seedling transplant unit as in claim 2, wherein the cup-like cells are welded to said top surface.

12. A reusable seedling unit for elevated growing using a growth medium, comprising:
a substantially flat member forming a top of the seedling unit, said flat member having a plurality of first openings all arranged adjacent to each other in an array,
said flat member having a plurality of pot-like cells, one depending from each opening,
each cell being formed from a plurality of elongated strip-like members spaced from each other and depending from the periphery of each said opening and converging downwards to form a cage-shaped cell,
the plurality of strip-like members of each cell converging to form slits between adjacent of said strip-like members, the slits having an average width which will not let through the growth medium in use, said converging strips being directly in contact with the growth medium in use and having resilience to spring back unassisted to their original position when temporarily forced to diverge by making the strips substantially parallel during downward release of said growth medium in use for replanting, the converging strips at their free bottom ends being substantially straight and forming an opening which will not let through the growth medium in use.

13. A seedling unit as in claim 12, wherein said slits have an average width between 2 mm and 10 mm.

14. A seedling transplant unit as in claim 12, wherein the average width of the strips is substantially equal to an average width of the slits.

15. A seedling transplant unit as in claim 13, wherein said strips of each cell have a transverse cross sectional profile which is convex towards the inside of each said cell.

16. A seedling transplant unit as in claim 15, including a plurality of apertures in the flat member in regions between said openings, to improve ventilation.

17. A seedling transplant unit as in claim 12, wherein the plurality of pot-like cells and said flat member together have a unitary construction.

18. A seedling transplant unit as in claim 12, wherein the cells are made of polypropylene.

19. A seedling transplant unit as in claim 12, wherein the cells and the flat member have a unitary construction made of Acrylobutylstyrene or ABS material.

20. A seedling transplant unit as in claim 12, wherein the cells are made of polystyrene.

21. A seedling transplant unit as in claim 12, wherein the pot-like cells are welded to the flat member.

* * * * *